United States Patent [19]

Collins et al.

[11] 4,066,174

[45] Jan. 3, 1978

[54] TRANSFER DEVICE FOR NESTABLE CONTAINER BODIES

[75] Inventors: Johnny Will Collins, Strafford, Mo.; Gunars Kochmanis, Uniondale, N.Y.; Bobby Ross Lynch, Ozark, Mo.

[73] Assignee: Owens-Illinois, Inc., Toledo, Ohio

[21] Appl. No.: 761,151

[22] Filed: Jan. 21, 1977

[51] Int. Cl.² .............................................. B65G 57/32
[52] U.S. Cl. ......................................... 214/7; 198/425; 198/467; 214/6.5; 214/8.5 SS; 93/93 HT
[58] Field of Search ............. 214/6.5, 7, 8.5 H, 8.5 SS; 198/422, 423, 425, 651, 803; 93/93 HT; 53/159; 221/175, 182, 184, 265

[56] References Cited

U.S. PATENT DOCUMENTS

| | | | |
|---|---|---|---|
| 2,641,095 | 6/1953 | Burbank | 93/93 HT |
| 3,217,859 | 11/1965 | Bartlo et al. | 198/425 |
| 3,389,811 | 6/1968 | Frank | 214/6.5 |
| 3,491,633 | 1/1970 | White | 93/93 HT |
| 3,497,086 | 2/1970 | Adams et al. | 214/7 |
| 3,630,393 | 12/1971 | Yamamuro | 214/7 |
| 3,661,075 | 5/1972 | Amberg | 214/8.5 H |
| 3,682,296 | 8/1972 | Buhayar et al. | 198/651 |
| 3,764,025 | 10/1973 | Van Melle et al. | 214/6.5 |
| 3,773,457 | 11/1973 | Badoux et al. | 214/6.5 |
| 3,791,537 | 2/1974 | Conklin | 214/6.5 |

FOREIGN PATENT DOCUMENTS 932,050  7/1955  Germany ........................ 93/93 HT Primary Examiner—Evon C. Blunk
Assistant Examiner—Richard K. Thomson
Attorney, Agent, or Firm—Myron E. Click; Harold F. Mensing

[57] ABSTRACT

A transfer device for seriately receiving from a forming machine frustoconical paper bucket bodies, nestably accumulating them in a horizontal column in a cylindrical front section of a rotatable drum, loosening the nested bucket bodies from each other in an enlarged cylindrical rear section of the drum, randomly separating the column of bucket bodies into small groups, intermittently conveying successive groups axially away from said drum to a lateral conveyor, conveying the groups laterally to a remote processing machine and adavancing said groups axially into said machine in a direction opposite from the first axial direction.

7 Claims, 6 Drawing Figures

TRANSFER DEVICE FOR NESTABLE CONTAINER BODIES

BACKGROUND OF THE INVENTION

This invention relates to a receiving and conveying device for nestable bucket bodies formed by wrapping arcuate sheet blanks around a forming mandrel and adhesively bonding overlapping portions of each blank together. The inside and outside edges of the blank overlap each other, thus increasing the thickness of the bucket wall along the seam. Under normal prior art conditions, an arcuate sheet blank would be wrapped around a frustoconical forming mandrel after glue had been applied to the overlapping portions of the blank, then the so formed bucket body would be stripped from the forming mandrel and nestably accumulated in a rack on the forming machine awaiting removal and transfer to an adjoining machine by an operator. Normally, the accumulated bucket bodies would become tightly wedged together, thus requiring the operator to forcibly disengage a group of bucket bodies from the end of the accumulated column and strike the side of the group against a fixed surface to loosen the bucket bodies in the group from each other prior to placing the group onto the feed conveyor of the adjoining finishing machine whereat the bucket bottom closure could be secured to the small end of the bucket body and a rim could be formed on the large end thereof, one bucket at a time.

In attempting to automate the transfer of the groups of bucket bodies from one machine to the other, numerous problems were encountered. A principal problem involved separating the accumulated bucket bodies into small groups so they could be transferred laterally by a relatively simple conveyor. Another problem involved loosening the nested bucket bodies from each other so they could be reliably denested mechanically on the adjoining machine for finishing operations.

SUMMARY OF THE INVENTION

The bucket body transfer device of this invention comprises a rotating drum having a generally horizontally disposed cylindrical section at the front end thereof for slideably receiving and nestably accumulating frustoconical bucket bodies from a forming mandrel. The drum is rotated out of synchronization with the forming cycle so that the seams of the bucket bodies are spaced rotationally with respect to each other. The rear end of the drum is an enlarged coaxially aligned cylindrical section having a diameter that exceeds the diameter of the column of nested bucket bodies so that the axially advancing column is not supported in this section. As the unsupported end of the rotating column increases in length, it begins to flex and wobble under the gravitational and rotational forces being exerted upon it, thereby loosening the bucket bodies slightly from each other. As intermittently operable conveyor separates a group of bucket bodies from the end of the column and conveys the groups of bucket bodies axially from the rear end of the drum to a pickup station where it is picked up by a separate conveyor and transported laterally to another axial conveyor which preferably runs in a direction opposite that of the first conveyor. The second axial conveyor feeds the bucket bodies into a second machine where the bucket bodies are denested one at a time, a bucket bottom is sealed to the small end and a rolled rim is formed on the large end of each bucket body. Sensing devices, coupled with control devices including retention means, may be used to regulate the transfer of the separated groups of bucket bodies.

The invention will be understood best by reading the following detailed description of it with reference to the accompanying drawings illustrating a preferred embodiment of the invention.

DETAILED DESCRIPTION OF THE INVENTION

Figure 3:
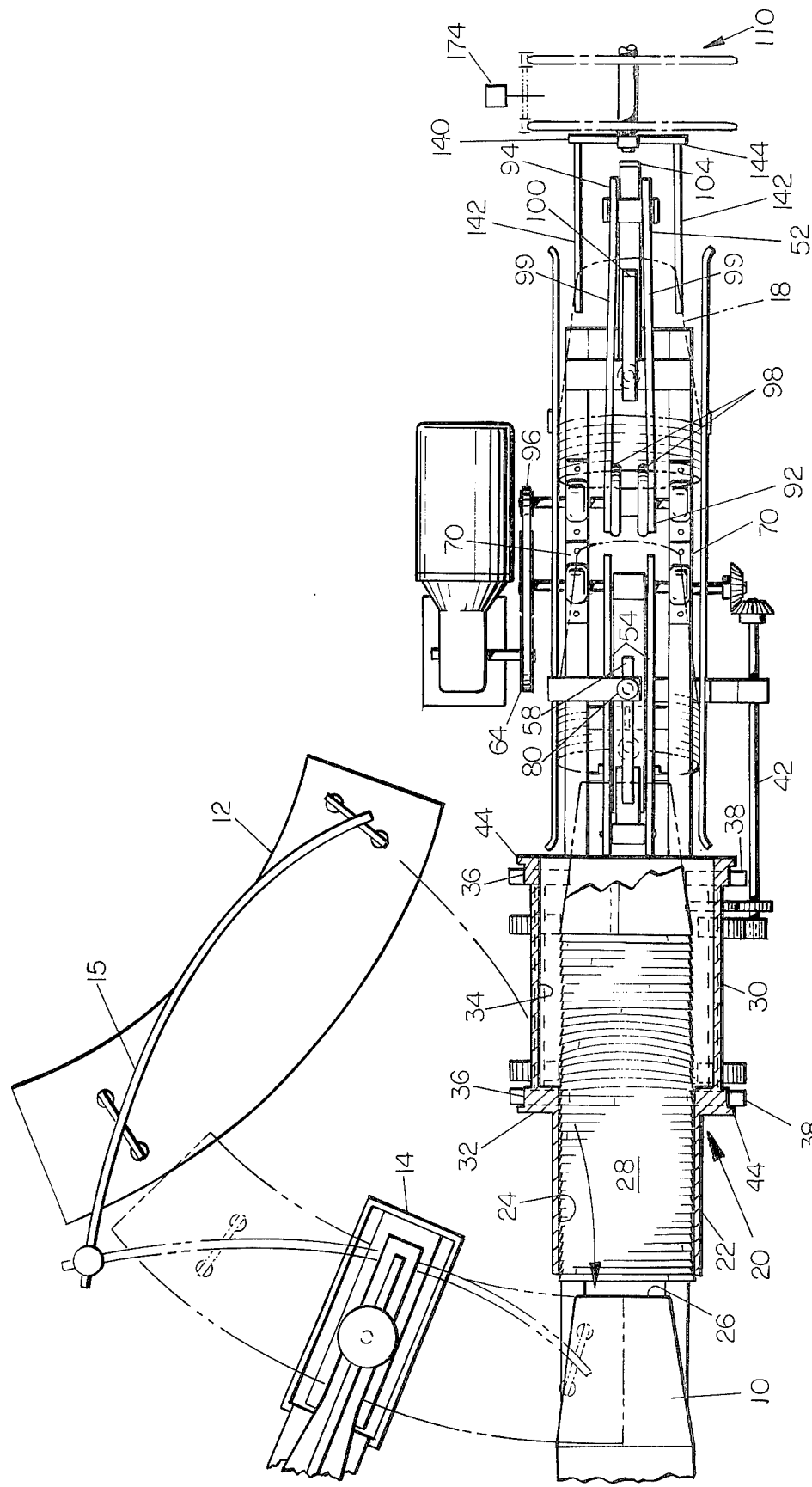
FIG. 3 is a plan view of FIG. 2.

Referring to the drawings, particularly FIG. 3, there is shown in partially schematic form a rotatable bucket forming mandrel 10, a stack of arcuate sheet blanks 12, a glue applicator 14 and a transfer arm 15 for pickup up the sheet blanks one at a time and bringing a leading edge into contact with the forming drum where it is held by vacuum means. The forming drum or mandrel 10 is then rotated to wrap the arcuate sheet blank around the drum so that the trailing edge of the blank is in overlapping relationship with the leading edge. In the process, the blank is drawn over a liquid adhesive applicator 14 whereat adhesive is selectively applied to the underlying surface portion of the blank which overlaps the inner portion. It is to be understood that the invention applies to buckets or similar cartons formed with a sidewall of single or double thickness. Upon completion of the bucket body forming cycle, the seamed portion 16 of the bucket body 18 is at the top of the forming mandrel 10. The bucket body 18 is stripped from the frustoconical forming mandrel and transferred bottom end first in an axial direction into the front end or receiving section of an accumulator-separator drum 20. The receiving section 22 of the drum has a cylindrical internal surface 24 with its cylindrical axis being generally horizontally disposed and aligned with the small end 26 of the forming mandrel. The internal diameter of this section is slightly larger than the maximum diameter of the bucket body, for example, ⅜inches, so that the bucket bodies are loosely held as they are nestably accumulated in the column 28. As each successively formed bucket body 18 is inserted in the column 28, the column is forced to advance axially stepwise in a rearward direction through the receiving section 22 and into the enlarged separator section 30 of the rotatable drum 20.

The rear end or separator section 30 of the rotatable drum 20 is rigidly connected to the front end or receiving section 22 of the drum by means of a step or offset section 32. The separator section 30 has a cylindrical interior 34 of larger diameter and greater length then the receiving section 22 and is coaxially aligned therewith. Preferably, the diameter is between 25 percent and 35 percent greater than that of the accumulator section and the length is at least 15 percent greater than the length of the accumulator section. Circumferential bearing surfaces 36 are located on the outside of the separator section 30 at opposite ends thereof. Support rollers 38 mounted on the machine frame 40 directly beneath the bearings frictionally engage the respective bearings. At least one of the rollers is coupled to a drive means 42 whereby the drum 20 is rotated out of synchronization with the bucket-forming cycle so that the seams of successive bucket bodies 18 are spaced at rotational positions of at least 60° from each other rather than being in alignment. Preferably the rotational speed of the drum 20 is between 4 and 7 rpm (revolutions per minute). A gear-type positive drive means could be used in place of the friction roller-type drive means. Axial movement of the drum is prevented such as by thrust-bearing means comprising annular ribs 44 extending radially outward from the drum bearing surfaces 36 so as to engage opposite sides of the axially fixed supporting rollers 38. Concentricity of the bucket bodies is enhanced by the random spacing of the bucket body seams 16 rotationally in the column 28 and by confinement of the nested column within the cylindrical receiving section 22 of the drum while the liquid adhesive becomes solidified.

As the column 28 of bucket bodies passes through the separator section 30 of the rotatable drum, the axial and rotational movement of the column combined with the gravitational forces acting upon the unsupported portion of the column in the separator section causes it to flex in a downwardly direction, thereby loosening the bucket bodies 18 from each other. When the loosely nested bucket bodies emerge from the downstream end of the separator section 30, small groups 46 of them are transported away from the drum in an axial direction by means of an offloading conveyor 50. Normally the number of bucket bodies in a group 46 ranges from 5 to 10.

The course of the offloading conveyor 50 preferably runs in a horizontal direction generally parallel with and beneath the drum axis from the rear end of the separator section to a separate conveyor extension 52 running in the same direction. The offloading conveyor 50 may comprise a pair of dual sheaves 56, 57 disposed at opposite ends of the belts 54 so that the belts lie in spaced apart vertical planes on opposite sides of a stationary horizontal bar 58 which lies directly beneath a rearward extension of the drum axis. Preferably the conveyor 50 is designed to be cycled from a conveying mode to a nonconveying mode. This may be accomplished by running the conveyor continuously and mounting it so that its upstream or forward end 60 may be swung downwardly out of the way of the emerging column end into a nonconveying position, for example, ½ inches below the stationary bar 58. While the conveyor 50 is in the downward or nonconveying position, shown in full lines in FIG. 2, any bucket bodies 18 that become positioned over the conveyor 50 are supported by the stationary bar 58 out of contact with the conveyor. The dual set of sheaves 57 at the downstream or rear end 62 of the conveyor is driven by V-belt means 64. In the embodiment illustrated in FIG. 2, the conveyor 50 has a support arm 66 that is journalled on the drive shaft 68 of the rear set of dual sheaves 57, which shaft is in turn mounted in a fixed position on the machine frame by means of bearing blocks 70. The shaft 72 for the forward set of dual sheaves 56 is journalled in a bearing block 74 rigidly connected to the distal end of the downwardly swingable supporting arm 66. A vertically reciprocable actuator 76 connected between the supporting arm 66 and the machine frame 40 beneath the conveyor 50 is used to automatically raise and lower the forward end 60 of the conveyor at fixed intervals or in response to certain signals as will be explained later. Guide rails extend alongside the conveyor 50 to channel and retain the bucket bodies centrally on the conveyor and on the stationary bar 58.

A retention device 80 such as a pneumatically operated plunger 82 is mounted directly above the stationary bar 58 between the middle and rear end thereof. The plunger 82 is set so it can be moved from a retracted position where it is out of contract with any bucket bodies beneath it to a position whereat it will contact the top of the group 46 of bucket bodies with sufficient force to stop the forward movement of any such bucket bodies 18 lying upstream from the plunger. The retention device 80 may be controlled by the same signals that control the offloading conveyor cycles.

The conveyor extension 52 located at the downstream end of the offloading conveyor 50 and in alignment therewith is structurally similar to conveyor 50 but is mounted in a fixed position on the machine frame 40 and the front set of dual sheaves 92 is the driven set rather than the rearward set 94. Preferably the drive means 96 is connected with the offloading conveyor drive means 64 so that the travel speed of the conveyor extension exceeds the speed of the offloading conveyor by a fixed ratio, for example, 3 to 1. Mounted concentrically on the inside of the front set of dual sheaves 92 is a pair of resilient rubber rings 98. The outer diameter of these rings 98 is greater than the outer diameter of sheaves 92. As a result of their greater diameter and narrower spacing, they contact the advancing bucket bodies and raise them above the horizontally disposed top runs of belts 99. This enhances entry of the leading end of advancing bucket bodies into the open end of any bucket or group of buckets resting in a fixed position on the conveyor extension 52. Additionally, the horizontal top runs of belts 99 converge slightly in a downstream direction so that the downstream end of any bucket bodies resting on the conveyor extension 52 are tilted upwardly more than if the belts were parallel. The bucket bodies resting in contact with conveyor extension 52 are temporarily held in a fixed position awaiting release to a lateral pickup by means of a vertically reciprocable ramp bar 100 inclined upwardly at a fixed angle in a downstream or rearward direction. A vertical actuator 102 is used to raise the ramp 100 from a position below the top runs of the conveyor belts 99 to a position above the top runs as is shown in full lines in FIG. 2. The rear end of this conveyor extension 52 protrudes beyond the machine frame 40 and has a vertical abutment 104 at its terminus for positioning the leading end of a group of bucket bodies 46 in the proper location for pickup by a lateral conveyor 110. When the ramp 100 is lowered, the group of bucket bodies temporarily held by it is rapidly advanced into pickup position against the abutment 104.

Figure 1:
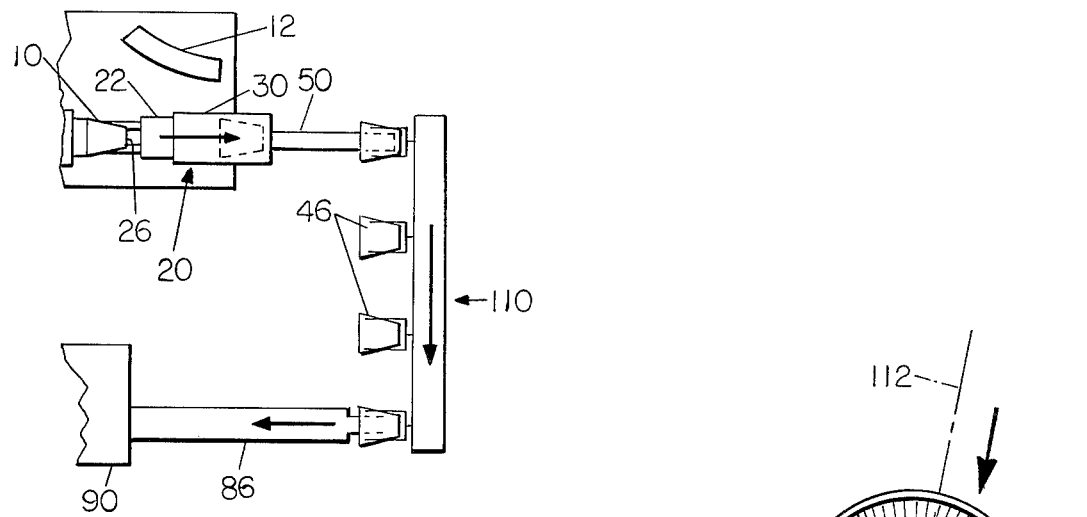
FIG. 1 is a simplified plan view of the transfer device including portions of the bucket body forming machine and the adjacent finishing machine with parts broken away.
Figure 4:
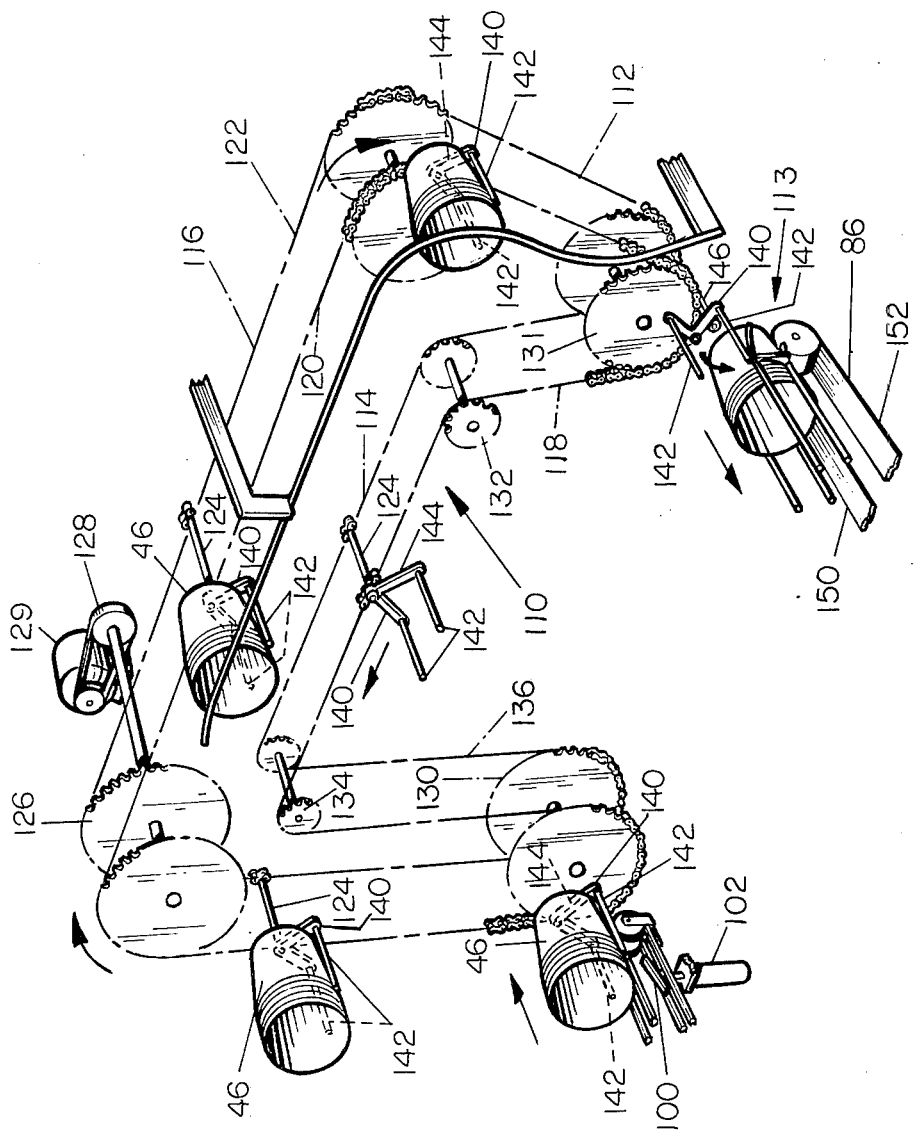
FIG. 4 is an enlarged perspective view of the lateral conveyor and portions of the axial conveyors shown in FIG. 1.

The lateral conveyor 110 picks up a group 46 of bucket bodies from the end of the offloading conveyor extension 52, transfers it through a generally inverted U-shaped course first laterally upward, then horizontally across and finally vertically downward where it dumps the group onto the onloading conveyor 86 of the finishing machine 90 (see FIGS. 1 and 4).

The downward delivery leg 112 at the right side of FIG. 4 may be inclined inwardly so as to approach the dumping station 113 at an obtuse angle. The return course 114 of the conveyor 110 runs inside the forwarding course 116 with the respective legs of each course paralleling one another except that the upward leg 118 of the return course leading from the dumping station may be inclined oppositely from the adjacent downward leg 112 of the forwarding course as shown in FIG. 4.

Preferably, the lateral conveyor 110 is a continuous loop conveyor comprising dual side chains 120, 122 symmetrically disposed in spaced-apart front and rear vertical planes with a plurality of runglike connecting rods 124 extending at right angles between the side chains 120, 122 to which they are anchored. The side chains are supported on a plurality of sets of dual sprockets rotatably mounted on the inside of the turns of the conveyor courses. At least one of the sets 126 is rotated by a drive means, including a speed reducer 128 and an electric motor 129. Preferably, the sets of sprockets 130, 131 at the lower ends of the upright legs of the lateral conveyor are of a relatively large diameter, for example 12 inches or more. The remaining sets of sprockets may be of smaller diameter but in the example shown in FIG. 4 only the two sets of sprockets 132, 134 on the inside corners of the return course 114 are of reduced diameter. The lower extremity of the pickup leg 136 of the lateral conveyor is below the level of the top run of the conveyor extension 50, and the lower extremity of the downward delivery leg 112 is above the level of the top run of the onloading conveyor 86.

Figure 5:
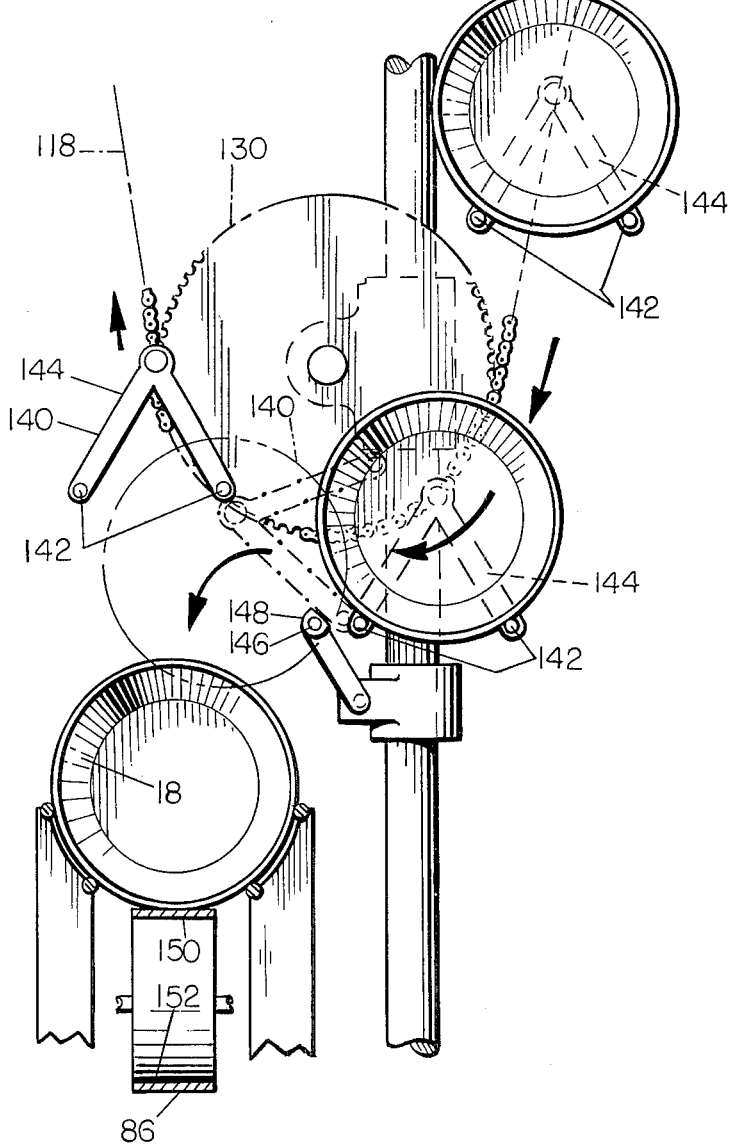
FIG. 5 is an orthographic view taken parallel to the sprocket axis of the lower right side of the lateral conveyor of FIG. 4.

Bucket body carriers 140 are swingably mounted on the front ends of the runglike connecting rods 124. Each of the carriers has parallel arms 142 which extend horizontally outward from the lower ends of a vertically disposed inverted V-shaped shoulder bracket 144 journalled at its top or apex end on its respective connecting rod 124 so that under normal conditions the parallel arms 142 remain in a horizontal plane as the carriers pick up successive groups 46 of buckets and deliver them to the laterally remote finishing machine 90. A trip rod 146 with a roller 148 on its distal end is rigidly mounted on the conveyor frame so that a line drawn from the sprocket 130 axis through the roller 148 axis lies between 5 o'clock and 7 o'clock positions on the sprocket 130 and the roller is directly in line with the travel path of the carrier shoulder brackets 144 (see FIG. 5).

When the leading edge of a shoulder bracket 144 is advanced into contact with the tripper, the movement of the lower end of the bracket is stopped while the rotational axis of the bracket continues to travel at the speed of the conveyor. This causes the bracket 144 to tilt sidewise, thus swinging the parallel arms 142 from a normally horizontal plane towards a vertical plane whereby the group 46 of buckets carried thereon is dumped onto the onloading conveyor 86 before the shoulder bracket 144 passes out of contact with the roller 148.

Figure 6:
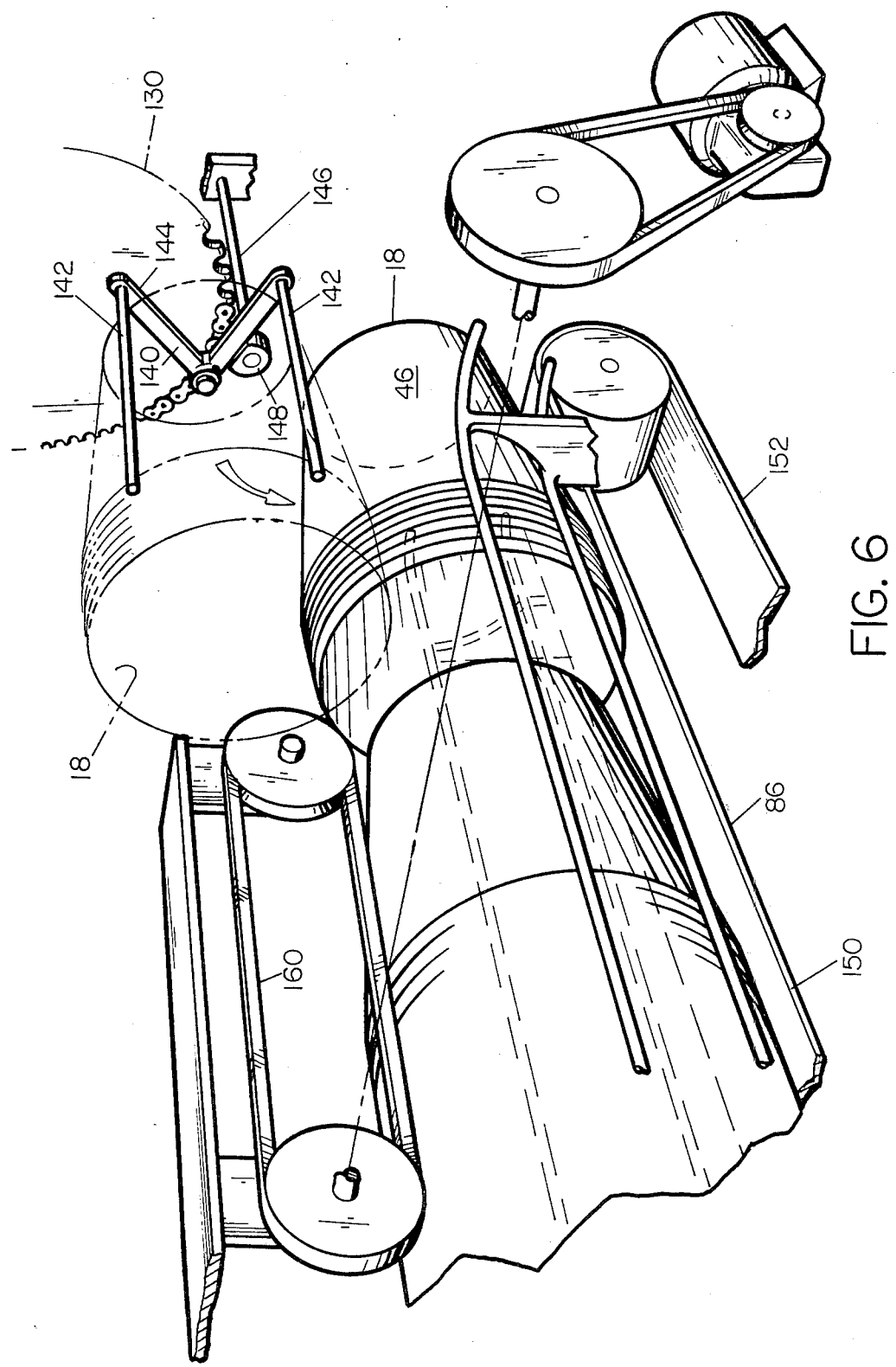
FIG. 6 is an enlarged perspective view of the axial conveyor leading into the bucket-finishing machine.

The onloading conveyor 86 for collecting the bucket bodies 18 and feeding them into a finishing machine 90 may be a continuous flat-belt type with horizontal forwarding 150 and return 152 runs (see FIG. 6). An auxiliary belt feeder 160 may be positioned above the onloading conveyor in contact with the top of the ingoing column of bucket bodies to bring the bucket bodies 18 into fully nested position with their bottom ends raised off of the conveyor and their axes into alignment with one another.

Figure 2:
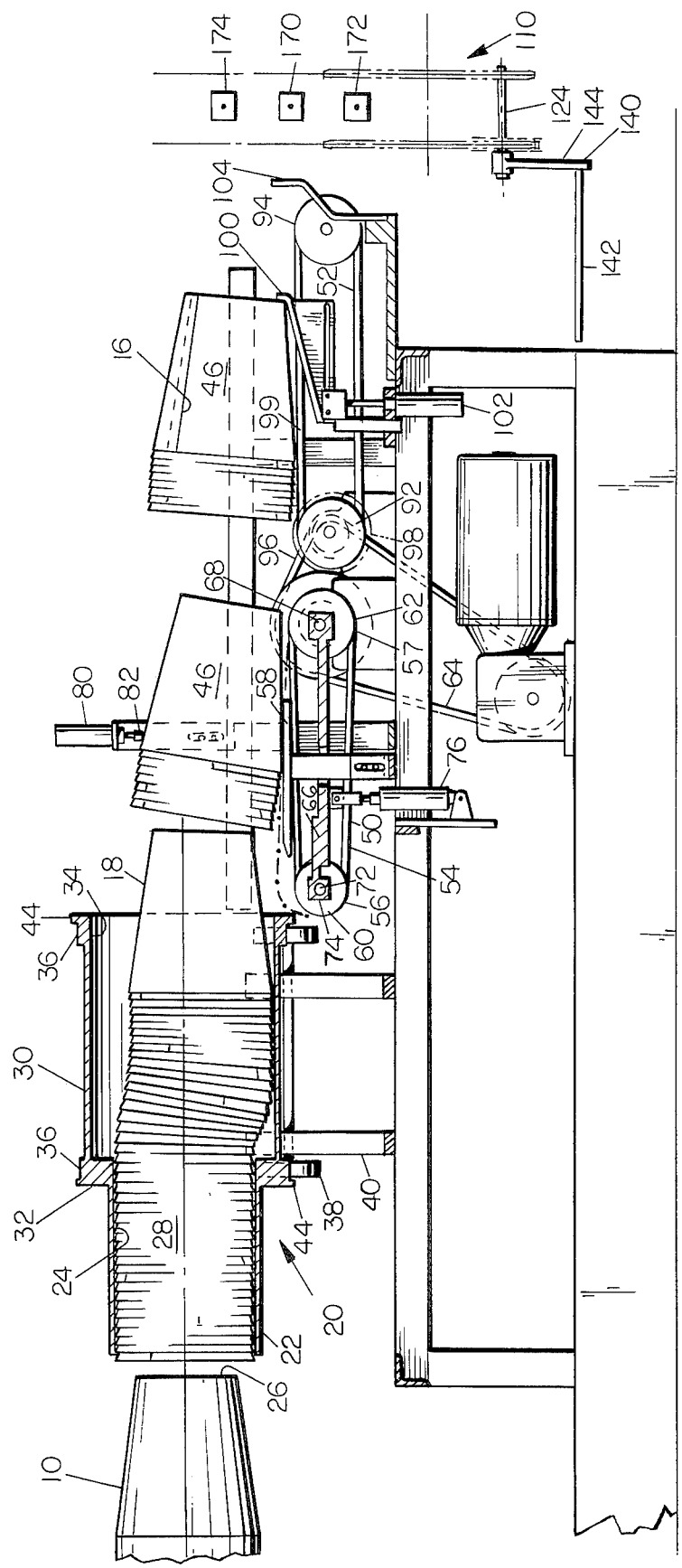
FIG. 2 is an enlarged sectional elevational view of the accumulator-separator drum and the axial conveyor shown in FIG. 1.

The cycling of the offloading conveyor 50 and the retention device 80 are controlled by a rattail type microswitch 170 located adjacent the outer run of the pickup leg of the lateral conveyor 110 (see FIG. 2). Switch 170 is positioned in between the side chains 120, 122 in the travel path of connecting rods 124 so that it is tripped each time a connecting rod passes by it. When the microswitch is tripped, it causes the actuator 76 to raise the upstream end of offloading conveyor 50 into the conveying position above the stationary bar 58 and simultaneously raise the plunger 82 of the retention device 80. A timer (now shown) returns the conveyor and plunger to their downward positions after a selected time period elapses. Similar microswitches 172, 174 located respectively below and above microswitch 170 (see FIG. 2) initiate the upward and downward strokes of ramp actuator 102.

It is to be noted that the offloading and onloading conveyors transport the bucket bodies in a direction generally parallel with the bucket axes while the interconnecting conveyor transport groups of bucket bodies in directions lateral to their axes. Furthermore, the bucket bodies travel in a bottom first direction on the offloading conveyor and in a reverse or top first direction on the onloading conveyor.

This invention has been described and illustrated with respect to a preferred embodiment but it is to be understood that numerous modifications may be made without departing from the true scope of the invention.

WE CLAIM:

1. A bucket body transfer device comprising: a horizontally disposed rotatable drum having an open-ended accumulator section for receiving frustoconical bucket bodies and nestably accumulating them in a column, said accumulator section having a cylindrical inner surface, a separator section integrally connected to said accumulator section, said separator section having an enlarged openended cylindrical inner surface coaxially aligned with said accumulator surface, means for rotating said drum, and an offloading conveyor at the exit end of said separator section.

2. A transfer device according to claim 1 wherein the internal diameter of said accumulator section is larger than the maximum diameter of said bucket bodies and the internal diameter of said separator section is between 25 percent and 35 percent greater than that of said accumulator section.

3. A transfer device according to claim 1 wherein said offloading conveyor transports said bucket bodies in an axial direction away from said drum is movably mounted for cycling between a conveying mode and a nonconveying mode.

4. A transfer device according to claim 3 wherein said offloading conveyor includes a separate conveyor extension at its downstream end driven by a common drive means such that the travel speed of the conveyor extension is greater than that of the upstream conveyor section.

5. A transfer device according to claim 4 wherein said separate conveyor extension is a twin belt conveyor mounted on front and rear sets of dual sheaves such that the top runs of the belts are horizontally disposed and converge in a rearward direction.

6. A transfer device according to claim 5 wherein said front set of dual sheaves has a pair of resilient rings mounted on the inside edges thereof, said rings having a greater diameter than said sheaves so as to extend beyond the outer surfaces of said belts.

7. A transfer device according to claim 1 wherein said offloading conveyor transports said bucket bodies in a first axial direction and further includes a lateral conveyor at the downstream end of said offloading conveyor, and a second axial conveyor for receiving bucket bodies from the lateral conveyor and transporting them in an axial direction opposite from said first axial direction to a bucket finishing machine.

* * * * *

UNITED STATES PATENT AND TRADEMARK OFFICE
CERTIFICATE OF CORRECTION

PATENT NO. : 4,066,174
DATED : January 3, 1978
INVENTOR(S) : Collins et al.

It is certified that error appears in the above–identified patent and that said Letters Patent are hereby corrected as shown below:

Col. 4, line 15 -- change "contract" to --contact--

Col. 6, line 52 -- after "drum" and --and--

Signed and Sealed this

Fourth Day of April 1978

[SEAL]

Attest:

RUTH C. MASON
Attesting Officer

LUTRELLE F. PARKER
Acting Commissioner of Patents and Trademarks